Feb. 3, 1942. E. O. ENGELS 2,271,937
METHOD AND APPARATUS FOR DISCHARGING BAKED LOAVES OF
BREAD, CAKE, OR THE LIKE FROM PANS
Filed July 18, 1940
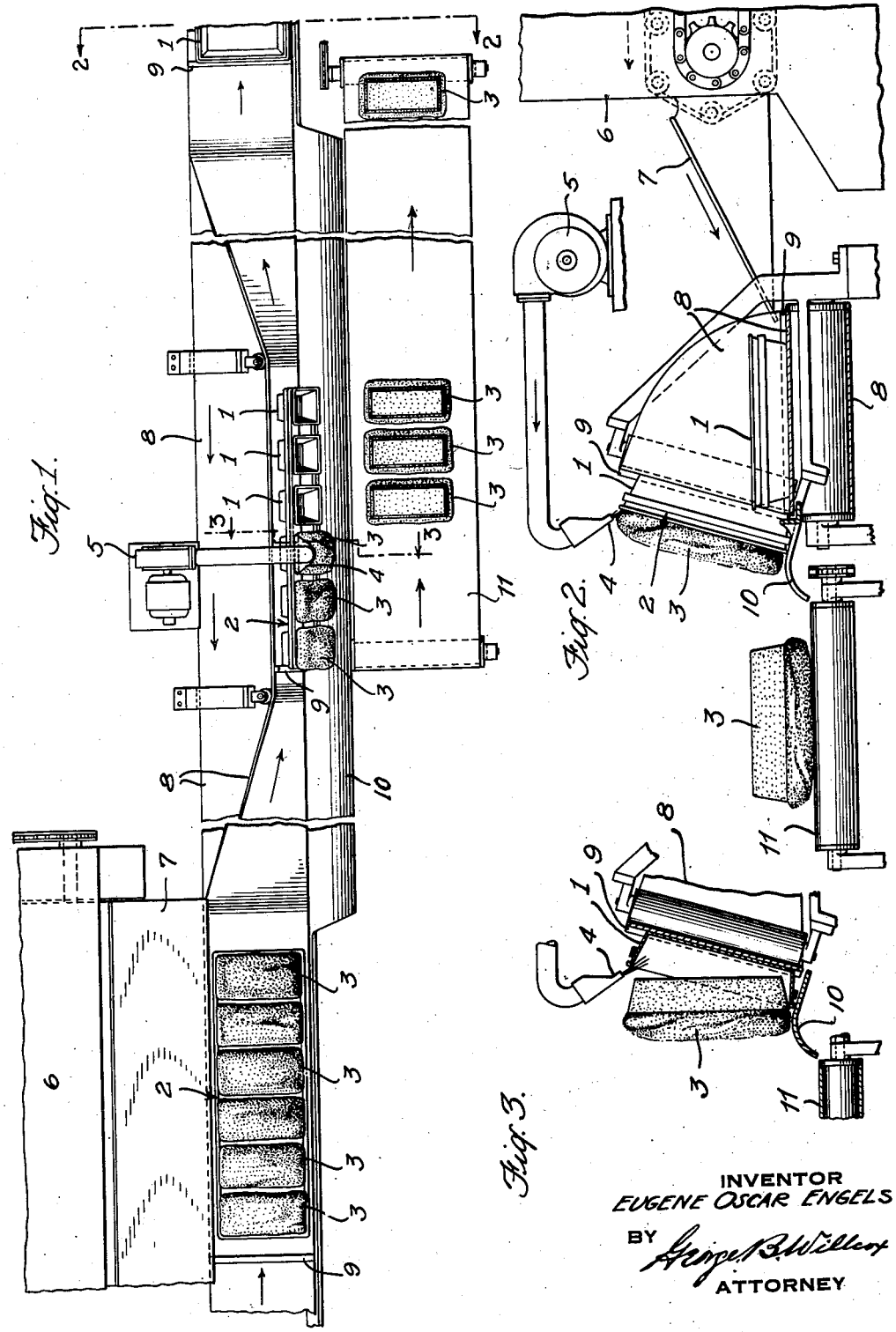
INVENTOR
EUGENE OSCAR ENGELS
BY
ATTORNEY Patented Feb. 3, 1942

2,271,937

UNITED STATES PATENT OFFICE

2,271,937

METHOD AND APPARATUS FOR DISCHARGING BAKED LOAVES OF BREAD, CAKE, OR THE LIKE FROM PANS

Eugene Oscar Engels, Saginaw, Mich., assignor to Baker Perkins, Inc., Saginaw, Mich., a corporation of New York Application July 18, 1940, Serial No. 346,158

13 Claims. (Cl. 214—1.1)

This invention is related to the problem of de-panning baked articles including bread and cake as they come from the oven. In commercial bakeries this is an important step in the chain of operations and one which has heretofore required manual performance.

This invention aims to effect automatically the removal of the loaves of bread or other articles from the pans as they come from the oven and the disposition of the separated pans and loaves and so dispense with the need of operators at this point where the temperature is so high as to be unfavorable to the performance of manual work.

The manual removal of the loaves involves the act of taking the pans as they come from the oven and turning them over individually or in sets and rapping them sharply in their inverted position until the loaves are dislodged and drop out. The pans by this operation become dented and in large bakeries the straightening, repairing and replacing of pans injured in this operation is an item of substantial expense.

The desirability of automatically discharging and handling the hot pans has long been realized in the trade and various plans for the purpose have been proposed and some of them tried but none has proved practical or commercially acceptable. For the most part they have endeavored to reproduce the manual acts, to lift the pans, invert them and dislodge the contents by their inertia.

Essentially the innovation in the present invention is the employment of pneumatic means to remove the contents from the pans. Broadly the employment of an air stream to expel contents from a container is well known, and often this is done by blowing air through the perforate bottom of the container. Obviously pans with bottom openings are not desirable in baking where the pans must be greased. A characteristic of my method is the fact that an air blast is directed down into the pan from the lip, in a direction opposite to the movement of the loaf from the pan, so that no opening in the pan bottom is required.

I have discovered that this is possible in the case of baked products such as bread which shrinks during the latter stage of its baking so that its adherence to the walls of the pans is discontinuous and there is space for air under pressure to enter between the loaf and pan. Therefore an air jet directed into a pan at one side of the rim between the side of the pan and the loaf in a direction generally parallel with and downwardly of the loaf, will almost instantaneously penetrate beneath the loaf, around the other sides, producing an expanding air cushion which loosens the loaf from the pan at all contacting surfaces. In addition to freeing the loaf, the air beneath it, confined by the relatively deep walls of the usual bread pan, will lift and eject the loaf from the pan.

An air jet at a pressure of ten to sixteen inches of water is practically instantaneous in its operation, only a fraction of a second being required to free a loaf completely, and if the pan be tilted on edge or end for application of the air the loaf can be blown clear. A single jet of economical size can in this way de-pan all of the loaves produced by the largest automatic oven as rapidly as the sets of racks of pans can be fed along a suitable guideway past the jet, either manually, or by conveyor means as shown and described herein.

Other features and advantages of the invention will appear in the course of the following specification.

Apparatus operating according to the method of the invention is illustrated in the accompanying drawing, in which Fig. 1 shows diagrammatically the de-panning apparatus applied to the discharge end of a traveling hearth oven;

Fig. 2 is a vertical section taken along line 2—2 in Fig. 1; and

Fig. 3 is a fragmentary section taken along line 3—3 in Fig. 1, showing the loaf in partially ejected position.

Referring to the drawing, baking pans 1 of conventional shape with side walls of substantial depth are strapped together side-by-side in the customary sets 2. Numeral 3 indicates the baked loaves of bread, cake, etc. A flattened nozzle 4 is mounted, directed, and located so that it will deliver a thin elongated blast of air downwardly inside the end wall of a pan 1. A blower 5, of a capacity sufficient to produce fifteen or sixteen inches of water column pressure at the nozzle is connected to the nozzle, preferably by flexible or telescopic tubing so that the position of the nozzle may be adjusted. Pans of baked loaves are discharged from the conveyor of a traveling oven 6 over a discharge plate 7 onto a pan conveyor 8 traveling toward the right in Fig. 1, which carries the sets of pans past the nozzle 4. Cleats 9 are provided at suitable intervals on the conveyor to enable the racks of pans 2 and carry them along positively. As the conveyor 8 approaches the nozzle it is tilted toward a vertical position, the pans being supported by a stationary guide rail 10 which aligns their upper ends as they pass to the nozzle 4. For emptying pans of any given size and inclination of walls the nozzle is adjusted in position and direction so that the air jet will be directed toward the bottom of each pan just inside the lip of and as nearly as possible parallel to its upper end wall. A bulging crust which more or less overhangs the edges will necessitate directing the air more or less laterally toward the loaf. The pan conveyor 8 returns to a horizontal path after it leaves the nozzle and carries the empty pans to a point not shown for discharge.

A loaf conveyor 11, which may be a cooling conveyor or may deliver into one, travels alongside the pan conveyor 8 in the same direction. Conveyor 11 may, however, be dispensed with and an inclined chute or table provided to receive the loaves.

Referring to Figs. 2 and 3, the operation of the jet from nozzle 4 can be readily understood. It first enters between the upper end of the tilted loaf 3 and the end wall of the pan 1, and expanding, urges the elastic crust of the loaf from the pan. The air next enters between the loaf and pan bottoms and almost simultaneously passes around the sides and the lower end of the loaf, breaking them free from the pan wherever they may stick. Since there is little or no pressure from the air jet at the top of the loaf and the air under pressure beneath the loaf is relatively confined by the pan walls, it lifts the loaf bodily, the loaf being tipped out upside-down as indicated in Fig. 3.

While I have shown an air jet applied in the most effective and economical way, at the upper end of the pans with the pans tilted endwise, the air current may also be applied at a side edge of the pan or at the lower end, or along two or more edges simultaneously. To apply a jet to the long side of a pan will, however, require a wider nozzle and therefore a blower of higher capacity to produce the desired action. The air jet may be applied to the lower end of the tilted loaf. In that case it will not be necessary to adjust the nozzle to take care of loaves of different size, although there is a tendency for the loaves to be tumbled by the air blast as they fall free. In the broad concept of the invention, it is contemplated that the air will be used to loosen the loaf in the pan irrespective of the position of the pan and irrespective of whether the operation is continued to the point of actual de-panning of the loaf.

It is to be understood that the form of my invention herewith shown and described is but a preferred application of the same, and that various changes in the mode of and mechanism for handling the pans and presenting them to the nozzle may be resorted to without departing from the spirit of the invention. For example, the pans need not be traversed past the nozzle, but a pan or set of pans may be tilted for discharge into a position which presents the desired edge or edges to the current or currents of air. The air stream may be produced by one or more nozzles of appropriate size and shape, operating intermittently or continuously; or, alternatively, a single nozzle may be traversed past the stationary pans.

In a small bakery a stationary inclined guideway may replace the conveyor 8, the sets of pans being fed by hand along the track and the rail 10 past the air jet.

Finally, the method of the invention may also be practiced advantageously with a hand-manipulated nozzle or blower to free delicate cakes from deep tins, the action being quicker and gentler than that of a scraper or other mechanical loosening device.

The term "air" as used herein includes any suitable gaseous or vapor medium under pressure. A steam supply may be available in certain bakeries and can be used in place of air, if desired.

The term "downwardly," as used with reference to a pan, in the specification and claims, means in a general direction from the pan rim toward its bottom.

Having thus described my invention, what I claim and desire to secure by Letters Patent is:

1. Apparatus for discharging baked loaves from pans having upstanding walls, comprising a traveling conveyor arranged to carry the pans of loaves in an inclined position with their upper walls in substantial linear alignment past a discharging station, a nozzle at said station, and a source of air connected to the nozzle, said nozzle positioned to direct a current of air downwardly inside the upper walls of the pans between the pans and the loaves.

2. Apparatus for freeing baked loaves of bread or the like from pans having upstanding substantially rectilinear peripheral walls, comprising a nozzle formed and positioned to direct a thin jet of air inwardly of the pans between a wall thereof and the crust of the loaf, means for supplying air under pressure to said nozzle, and a conveyor to carry the pans arranged to present a wall of each pan in succession to the jet of air from the nozzle.

3. Apparatus as claimed in claim 2, wherein the pan-conveying means is arranged to support the pans in an inclined position adjacent the nozzle, whereby the loaves are ejected clear of the pans.

4. Apparatus for de-panning loaves of bread or the like comprising a traveling conveyor for receiving the panned loaves having a section tilted to a substantial inclination, a guide rail at the bottom of the inclined section for effecting a uniform alignment of the pans along this section, an air nozzle opposing the inclined section and directed toward the conveyor in position to introduce a current of air between a side of the loaves and the adjacent wall of the pans toward the pan bottoms as the pans pass, a source of air pressure connected to the nozzle, and another traveling conveyor on the opposite side of the guide rail for receiving the loaves.

5. Apparatus for de-panning loaves of bread or the like comprising a traveling conveyor for receiving the panned loaves having a section tilted to a substantial inclination, a guide rail at the bottom of the inclined section for effecting a uniform positioning of the pans transversely of this section, an air nozzle opposing the inclined section and directed toward the conveyor in position to introduce a current of air between a side of the loaves and the adjacent wall of the pans toward the pan bottoms as the pans pass.

6. Apparatus for freeing baked loaves of bread or the like from pans having upstanding substantially rectilinear peripheral walls, consisting of pan-supporting and aligning means along which a pan may be moved so that the rim of one wall travels endwise in a linear path, a nozzle adjacent said path of travel of the rim formed and positioned to direct a current of air downwardly into the pan between said wall and the loaf, and means for supplying air under pressure to said nozzle.

7. Apparatus as claimed in claim 6, wherein the pan-supporting and aligning means is arranged to support the pan in an inclined position at the nozzle, whereby the loaves will be ejected clear of the pan.

8. Apparatus for freeing a baked bread loaf, cake, or the like from a pan having a peripheral wall, consisting of a nozzle connected to a source of air under pressure and means for positioning the rim of said pan and the nozzle in spaced relation so that the stream of air from the nozzle is directed downwardly between the wall of the pan and the surface of the loaf.

9. Apparatus as claimed in claim 8 wherein means is provided for moving the nozzle and the wall of the pan relatively to each other lengthwise of said wall.

10. The method of removing bread or the like from the pan in which it is baked consisting of disposing the pan with its contained loaf in an inclined position and directing a stream of air under pressure from a point adjacent the rim of the pan toward its bottom between the loaf and the adjacent side wall of the pan.

11. The method of freeing a baked bread loaf, cake, or the like from a pan having a peripheral wall, consisting of traversing a stream of air relative to and along an edge of the pan, said air stream being directed downwardly into said pan between its wall and the crust of the loaf.

12. The method of removing baked bread loaves from a plurality of pans secured together in fixed alinement, tilting them to a nearly erect position, and moving the pans past a stream of air in position to direct the air successively into each pan between the lip of the pan wall and the crust of the loaf.

13. The method of freeing baked bread or the like from the pan in which it is baked, consisting of directing a stream of air into the pan from a point adjacent its rim downwardly between a wall thereof and the crust of the loaf, said stream having velocity sufficient to separate the loaf from the pan.

EUGENE OSCAR ENGELS.